United States Patent
Rogers et al.

(10) Patent No.: US 6,301,484 B1
(45) Date of Patent: Oct. 9, 2001

(54) METHOD AND APPARATUS FOR REMOTE ACTIVATION OF WIRELESS DEVICE FEATURES USING SHORT MESSAGE SERVICES (SMS)

(75) Inventors: John G. Rogers, San Diego; Eric J. Lekven, Carlsbad, both of CA (US)

(73) Assignee: Qualcomm Incorporated, San Diego, CA (US)

(*) Notice: Subject to any disclaimer, the term of this patent is extended or adjusted under 35 U.S.C. 154(b) by 0 days.

(21) Appl. No.: 09/387,615

(22) Filed: Aug. 31, 1999

(51) Int. Cl.[7] ........................................ H04Q 7/20
(52) U.S. Cl. ................ 455/466; 455/418; 455/419; 455/186.1; 455/566
(58) Field of Search ................... 455/466, 418, 455/419, 414, 186.1, 550, 556, 44

(56) References Cited

U.S. PATENT DOCUMENTS

| | | | |
|---|---|---|---|
| 5,282,250 | * | 1/1994 | Dent et al. ............................ 380/23 |
| 5,794,142 | * | 8/1998 | Vanttila et al. ...................... 455/419 |
| 5,950,130 | * | 9/1999 | Coursey ................................ 455/432 |
| 5,956,636 | * | 9/1999 | Lipset .................................... 455/411 |
| 5,978,685 | * | 11/1999 | Laiho .................................... 455/466 |
| 5,987,323 | * | 10/1999 | Huotari ................................ 455/433 |
| 6,014,561 | * | 8/1998 | Molne ................................... 455/419 |
| 6,023,620 | * | 2/2000 | Hansson .............................. 455/419 |
| 6,029,065 | * | 2/2000 | Shah ..................................... 455/414 |
| 6,055,442 | | 4/2000 | Dietrich ............................... 455/558 |

FOREIGN PATENT DOCUMENTS 9742782    11/1997  (WO) .............................. H04Q/7/32

* cited by examiner

Primary Examiner—Fan Tsang
Assistant Examiner—Marceau Milord
(74) Attorney, Agent, or Firm—Philip B. Wadsworth; Charles D. Brown; Raymond B. Hom

(57) ABSTRACT

A method and apparatus for remote control of software and hardware features of a wireless communication device using Short Message Services (SMS). A wireless communication device with SMS capabilities can be remotely configured by sending specifically configured SMS messages. A manufacturer can configure a wireless device to have control over certain features accessible through SMS messages. A configuring SMS message is constructed using a specific format to inform the wireless device of the presence of a feature control message. Predetermined combinations of characters unlikely to occur in normal messages are used as message start and stop delimiters. A series of fields are defined in the SMS message with the fields separated by delimiters distinct from the message start and stop delimiters. Commands may be sent to the wireless device using point-to-point as well as broadcast SMS messages. The wireless device receives the SMS message and identifies it as a feature control command by noting the presence of a message start delimiter. The message is then parsed according to the field delimiters within the message. The wireless device then configures software and hardware features according to the contents of the SMS message fields.

10 Claims, 3 Drawing Sheets

METHOD AND APPARATUS FOR REMOTE ACTIVATION OF WIRELESS DEVICE FEATURES USING SHORT MESSAGE SERVICES (SMS)

BACKGROUND OF THE INVENTION

I. Field of the Invention

The present invention relates to wireless communications. More particularly, the present invention relates to a novel and improved method and apparatus for remote control of software and hardware features in a wireless communication device using Short Message Services (SMS).

II. Description of the Related Art

Wireless communication systems are constantly evolving. System designers are continually developing greater numbers of features for both service providers as well as for the end users. In the area of wireless phone systems, cellular based phone systems have advanced tremendously in recent years. Wireless phone systems are available based on a variety of modulation techniques and are capable of using a number of allocated frequency bands. Available modulation schemes include analog FM and digital modulation schemes using Time Division Multiple Access (TDMA) or Code Division Multiple Access (CDMA). Each scheme has inherent advantages and disadvantages relating to system architecture, frequency reuse, and communications quality. However, the features the manufacturer offers to the service provider and which the service provider offers to the consumer are similar between the different wireless systems.

Regardless of the modulation scheme in use, the wireless phone available to the end user has myriad features implemented. Nearly all wireless phones incorporate a display that allows the user to enter text banners, display dialed numbers, and display incoming caller numbers. Additionally, wireless phones may incorporate electronic phonebooks, speed dialing, single button voicemail access, and messaging capabilities.

Of course, in order for the consumer to take full advantage of all the features implemented in the phone many of the features require complementary feature support from the service provider. Voicemail storage and messaging capabilities necessarily must be implemented by the service provider in order for the consumer to have access through their supporting phones.

Additionally, features that are not apparent to the user may be incorporated into phones and capable of service provider support. A feature such as slotted paging allows a phone to monitor the RF link for paging messages only during an assigned time frame. This allows the phone to power down to an idle state during time frames that are not assigned to the phone. This allows the phone to conserve battery life, thus increasing standby and talk times. Slotted paging can increase the service provider's message capacity since phones can be distinguished using the assigned time slot in addition to addressing. Although the phone user benefits from slotted paging, the implementation and usage of the feature cannot be seen or initiated by the phone user.

The features described above present only a sample of features that are capable of, or have already been, implemented into wireless phone systems. Any individual feature is capable of implementation into some or all of the wireless systems using the modulation schemes mentioned above. A particularly useful feature provides messaging capability within phones. The Short Message Services (SMS) feature used in a CDMA wireless communication system allows for information transfer to and from a wireless phone. However, the implementation of SMS is not limited to use in a CDMA system. The description of SMS in a CDMA system is merely provided as a foundation for the discussion of the preferred embodiment of the invention presented below.

Short Message Services (SMS) are used to allow the communication of alphanumeric messages to wireless phones. The general specification for SMS in a CDMA phone system can be found in Telecommunications Industry Association and Electronic Industries Association specification TIA/EIA/IS-637, SHORT MESSAGE SERVICES FOR WIDEBAND SPREAD SPECTRUM CELLULAR SYSTEMS. The general specification for the CDMA phone system can be found in TIA/EIA/IS-95, MOBILE STATION-BASE STATION COMPATIBILITY STANDARD FOR DUAL-MODE WIDEBAND SPREAD SPECTRUM CELLULAR SYSTEM.

In a CDMA wireless communication system information is carried over multiple channels on a carrier frequency distinguished by modulation using orthogonal codes. The forward link (base station to subscriber unit) and the reverse link (subscriber unit to base station) use different carrier frequencies. The distinct orthogonal codes define channels for communication of information. Aside from the Pilot and Sync channels, there may be multiples of each channel type within the coverage area of any particular base station. Each channel will be distinguished by a separate orthogonal code such that simultaneous communication over the same frequency space is possible.

The subscriber unit, or phone, uses the Pilot and Sync channel transmissions by each base station to acquire and synchronize to the CDMA system. The Pilot and Sync channels contain system overhead information only and the subscriber unit does not transmit on these channels. The subscriber unit utilizes the Pilot and Sync channels to align the internal timing of the subscriber unit with the timing of the base station.

One or more Paging channels may exist in the system. Once the subscriber unit has acquired the Pilot and Sync channels, it monitors the Paging channel for messages directed to it. The messages may include overhead messages relating to link parameters or may include directed messages for a particular subscriber unit. The Paging channel is also used to transmit acknowledgements or responses to messages generated by the subscriber unit. The communication on the Paging channel can be directed from the base station to an individual subscriber unit, as in the case of an acknowledgement message, or can be directed from the base station to many subscriber units simultaneously, as in the case of broadcast messages.

The complement to the Paging channel is the Access channel. The base station monitors the Access channel for messages generated by the subscriber unit. The subscriber unit can transmit a variety of messages to the base station on the Access channel. The messages may include data burst messages, acknowledgements or responses to received paging messages, and registration access messages.

The Traffic channel completes the list of channel types available in a CDMA wireless communication system. The Traffic channel is used for voice, data, and messages. When communication is assigned to a Traffic channel both a forward link channel, enabling communication from the base station to the subscriber unit, and the reverse link channel, enabling communication from the subscriber unit to the base station, are dedicated to the current communication.

As mentioned above, the SMS feature allows the communication of short alphanumeric messages between the base station and the subscriber unit. Messages may be initiated at a message center and transmitted via the base station to the subscriber unit. Messages may also be initiated at the subscriber unit and transmitted to the message center through the base station.

Messages transmitted from the base station to the subscriber unit may be transmitted over the Paging or Traffic channels. The messages transmitted to the subscriber unit are formatted as Data Burst Messages as defined in TIA/EIA/IS-95. Messages may either be directed to individual subscriber units as point-to-point messages or may be simultaneously directed to many subscriber units as broadcast messages.

Even when broadcast messages are sent there is still the ability to provide some subscriber unit differentiation. The ability to direct broadcast messages to particular groups of subscriber units is provided in broadcast addresses. Subscriber units process a broadcast message only if it has been configured to accept the broadcast address. If the subscriber unit has not been configured to accept the broadcast address, the message will be discarded and not processed.

However, the multitude of features available on any particular wireless communication system presents problems to the service provider. The service provider may not choose to initially enable all features. The service provider may also choose to implement new features as they are developed. Subscriber units are initialized with features matching those offered by the service provider even though the phone may be capable of supporting additional features. Unfortunately, when the service provider activates new features, the phone must be manually updated to activate the additional feature. The manual update is either performed by requiring the user to return the subscriber unit to the service provider for update or by instructing the user to activate the feature through a series of keypad entries. Requiring the user to return the subscriber unit to the service provider for update is extremely inconvenient to the user and may result in many phones not having the feature activated. Similar problems exist when requiring the user to activate the feature through keypad entries. The user is instructed in how to access a protected service menu within the phone software and is provided directions in how to activate the feature. The user may never receive the instructions or, if the user is technologically unsophisticated, may be hesitant to attempt to activate the feature. Moreover, there is the danger that erroneous entry of information by the user may render the phone inoperable. What is needed is a method for remotely updating the feature set within a subscriber unit such that new features may be activated without user participation. Preferably, the activation would occur over the wireless communication link using an existing communication method.

SUMMARY OF THE INVENTION

The present invention is a novel and improved method and apparatus for remote activation of software and hardware features available within a wireless phone. The control of the phone features is accomplished using SMS messages. A feature control message is an SMS message constructed using a predetermined format. An SMS message is designated a feature control message if it begins with a predetermined start of message delimiter. Since SMS is typically used to relay alphanumeric messages to be displayed to the user, the start of message delimiter is defined as a set of characters that normally do not begin a message and that normally do not occur in succession. Once the phone has determined that a start of message delimiter has been received, the phone enters an SMS feature control routine. Successive predetermined data fields within the SMS message are parsed to provide the specific feature control information. The successive data fields are each delimited with another predetermined character or set of characters. The separate data fields provide information including applicable phone model the control instruction is directed towards, minimum software version required of the phone, predetermined feature code, and specific mode information required to support the feature code. Each of the data fields may be encrypted in order to provide a level of security to the feature message. Alternatively, a data field consisting of encrypted authentication data may be used to provide message security. An end of message delimiter is used to signify that the control message is complete.

The phone hardware must be configured to support remote feature control. There are no changes required of the phone RF receive sections. Changes are only required in the digital processing section that normally services the received SMS message. Rather than servicing all messages as alphanumeric display messages the hardware is required to determine whether or not the message is a feature control message. A digital processor must identify the presence of a feature control message, parse the message to retrieve the contents of each data field, and set the parameters of the available feature to correspond to the received message. The parameters identified in the feature control message include feature codes and feature modes. The phone memory includes a predetermined feature code space that contains a plurality of addresses corresponding to the plurality of feature codes. Each feature code has a corresponding address space available for storage of the feature modes required by that feature code. The feature code and feature modes are typically saved in non-volatile memory to maximize data reliability over all phone operating conditions.

In this manner the service provider utilizes an existing communication method to control the availability of features within user phones. The implementation of remote feature control requires no additional hardware for the service provider and does not interfere with standard SMS message performance. Furthermore, the feature update requires no action by the phone user. This greatly simplifies the process of updating all available phones and is least intrusive to the phone user.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

Presently, in order to accommodate the future inclusion of known features within a wireless phone, the manufacturer provides for special manufacturing runs of wireless phones to allow the service provider to enable and disable the features. To change the availability of a feature within one of these phones, the phone must be returned to the service provider or the user must be provided with instructions on how to enter special service menus and with specific details on how to change the feature availability. The present invention allows the service provider to enable and disable wireless phone features without requiring the phone to be returned to the service provider for implementation. The service provider directs the phone to enable or disable a feature through a feature control message transmitted to the phone using SMS. In order to distinguish the feature control message from ordinary SMS alphanumeric messages, pre-determined special characters indicating the presence of a feature control message are used.

Figure 1A:
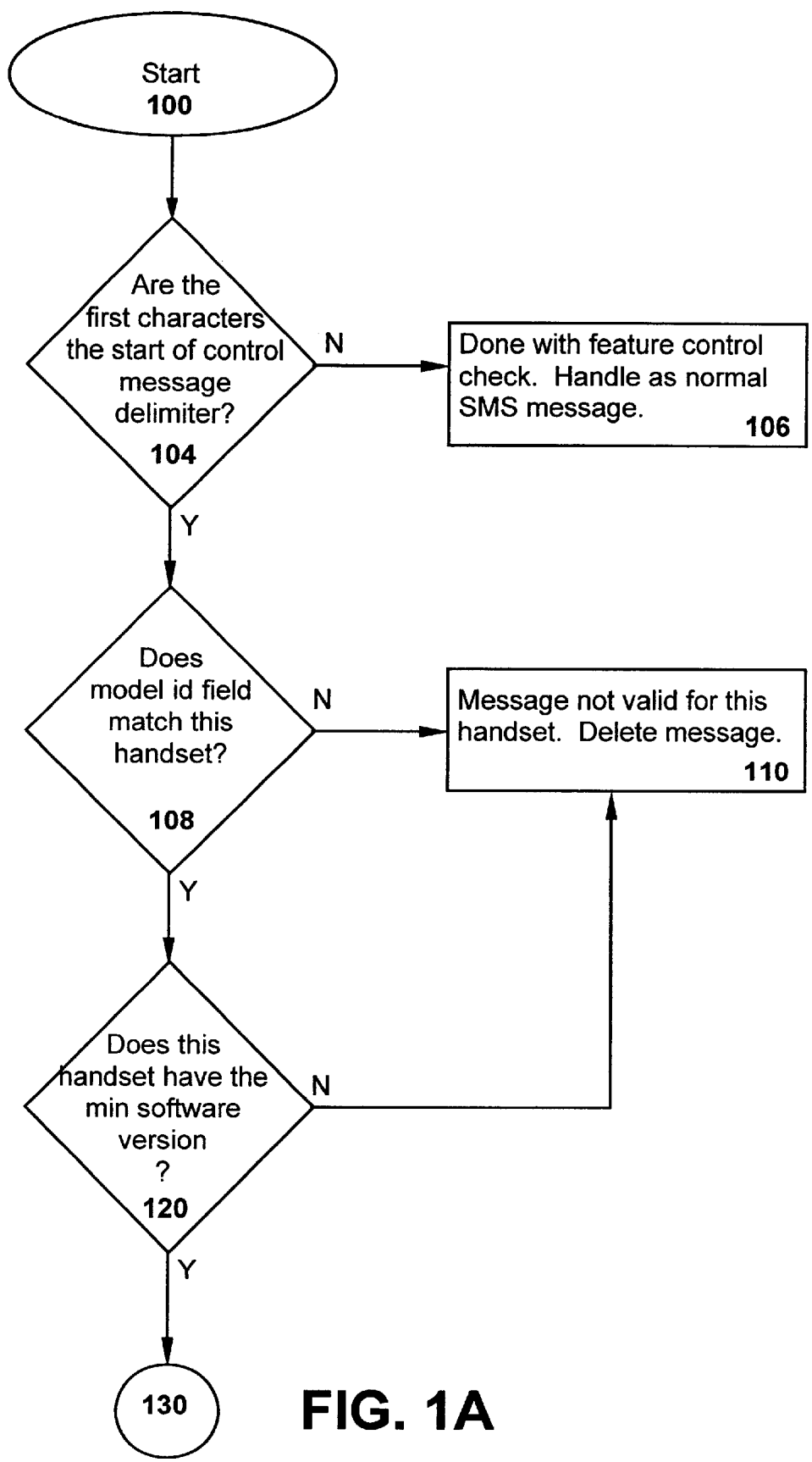
FIGS. 1A–1B are flow charts showing the SMS interpretation routine.

When a phone receives any SMS message, it must check to see if it is a feature control message. The phone performs this by performing the feature control routine of FIGS. 1A–1B. Referring to FIG. 1A, when an SMS message is received, the phone begins by comparing the first characters of the received message with a predetermined start of control message delimiter, step 104. To prevent the phone from falsely concluding that a received SMS message is a "feature control message" the "start of control" message delimiter is defined to be a series of characters that normally does not occur at the start of a message and that does not normally occur in sequence. As examples, the start of control message delimiter could be "??QC?", "((QC", or "))12". The number of characters and specific characters used are not limited but should be chosen to minimize false indications of feature control messages. If at step 104 it is determined that the first characters do not indicate a feature control message, the phone does not attempt to alter any features and merely handles the message as a normal SMS message, step 106.

If the phone determines that the message represents a feature control message the routine advances to step 108 to interpret the next data field in the message. The data field following the start of control message delimiter identifies the model ID number of the phone that the feature control message is directed towards. The model ID can be any number of digits. The end of the model ID number is identified using a predetermined delimiter denoting the separation of data fields. The delimiter denoting the separation of data fields can be a single character but must be chosen such that any of the data fields will not use the delimiter as part of the data. A single character that satisfies this requirement is the question mark, "?".

If the number in the model ID field does not match the model ID of the receiving phone then the feature control routine proceeds to step 110. At step 110 the message is deleted since it is determined that the message is not valid for this particular phone. Deleting the message results in the termination of the feature control routine since there are no more data fields to examine.

However, if the model ID received in the SMS message matches that of the phone, the routine advances to step 120 to examine the next data field in the message. At step 120 the phone extracts the next data field, which corresponds to the minimum software version required of the phone. Again, the data field can be any number of characters in length with the end of the data field identified with a delimiter. The same delimiter used to identify the end of the model ID data field will likely be used as the delimiter to identify the end of any subsequent data fields. The phone extracts the minimum software number from the SMS message and compares it to the current phone software version. A minimum software version is included in the feature control message to take account of software and hardware evolution within the same phone models. Features that are available in later software revisions of the same model phone may not have been incorporated in earlier versions of the phone. Additionally, feature codes may have been updated within a software revision, and the feature addressed through a feature code of an earlier software revision may not correspond to the same feature in a later software revision. If the phone does not have the minimum software version, the routine proceeds to step 110 where the SMS message is deleted and the feature control routine is terminated.

Figure 1B:
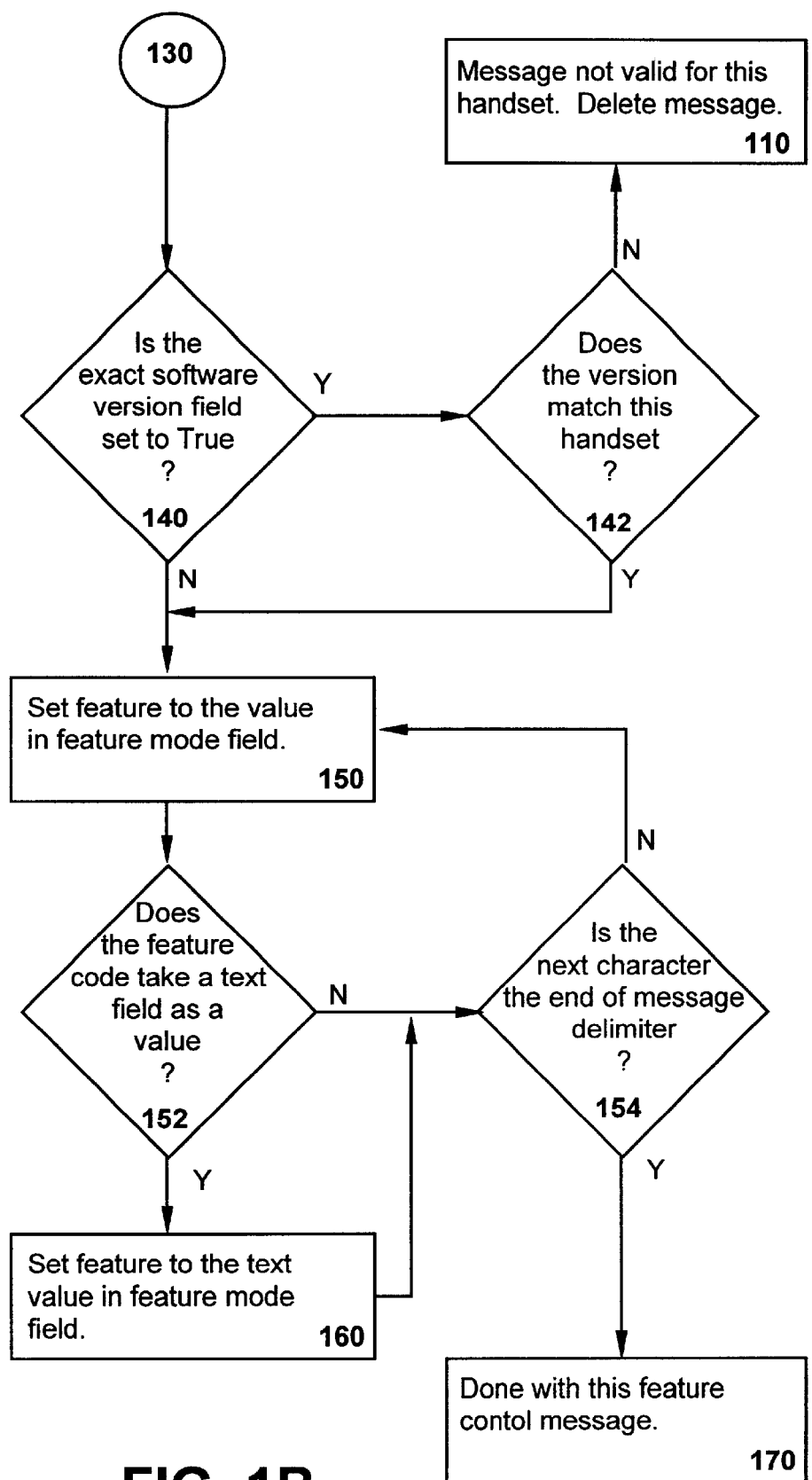

If in step 120 it is determined that the phone has at least the minimum software version, the routine advances to point 130, which serves to connect the flow chart of FIG. 1A with the flow chart of FIG. 1B.

Referring to FIG. 1B, from connecting point 130 the routine proceeds to step 140 to extract the next data field. The next data field informs the phone whether or not the exact software version extracted in the minimum software field is to be used. As in the case of the earlier data fields, this data field is terminated with a delimiter. However, since this data field is only used to inform the phone as to a limitation of using only an exact software version, it can be a single character in length. If the data field is true, designated by a "T", only the exact software version denoted in the minimum software version data field is to be used. If the data field is false, designated by a "F", any software version greater than or equal to the minimum software version is acceptable.

If, at step 140, it is determined that the exact software version field is set to True, the feature control routine advances to step 142 to compare the earlier extracted minimum software version with the current software version of the phone. If the exact software version field is True and the software version received in the SMS control message does not match that of the phone, the routine proceeds to step 110 where the message is deleted and the phone terminates the feature control routine. Step 110 is identical to that shown in FIG. 1A and is duplicated in FIG. 1B to minimize connecting references between the two figures.

If it is determined at step 140 that the exact software version field is set to False, or if at step 142 it is determined that the minimum software version and the phone software version are the same, the routine proceeds to step 150 to extract the feature codes and corresponding feature modes.

The next data field to be extracted is the feature code. Predetermined feature codes are used to identify features that may be controlled using SMS messages. Each feature code may require one or more feature modes that are required to be set. The number of feature modes that are required may be defined by the range of numbers that identify the feature code or may be stored within memory in the phone. Feature codes from 1–10,000 may require only one feature mode and feature codes from 10,001–20,000 may require two feature modes, etc. Alternatively, the number of the feature codes may define the existence of an additional data field identifying the number of following feature modes. For feature codes from 1–10,000 only one feature mode may be required whereas for feature codes from 10,001–20,000 the data field following the feature code is defined as a data field identifying the number of feature modes required by the feature codes.

At step 150 the feature code and feature mode are extracted from the SMS message. The programmable variable of the feature is then set to the value extracted from the feature mode field. At step 152, if it is determined that the feature code requires a text field as its value, the routine advances to step 160 where the feature mode is set to the text value extracted from the feature mode field. The actual text data will be further delimited by markers indicating the start and end of the text data. If text data is not indicated, the feature mode is set to the value represented in the feature mode field.

The security of the feature control messages can be enhanced by requiring that each feature control message includes an authentication field as one of the data fields. Alternatively, each of the data fields could be encrypted. Either of these two methods prevents an unauthorized user from sending an SMS message in the format that would enable features in the phone to be turned on or off.

The feature control routine next proceeds to step 154 to determine if the next portion of the control message is the end of message delimiter. The end of message delimiter is a character or set of characters not normally used in feature codes or feature modes that signal the end of the control message. If the end of message delimiter is detected, the routine proceeds to step 170 and terminates the feature control routine. However, if the end of message delimiter is not detected, the routine returns to step 150. At step 150 additional feature modes or feature codes will be extracted. If the prior feature code extracted required multiple feature modes and not all feature modes have been set, the next data field represents a feature mode. If all feature modes have been set for the prior feature code, the next data field represents a new feature code. In this manner, multiple feature codes can be set using a single SMS feature control message.

Two examples are provided to further illustrate the operation of the flow chart of FIGS. 1A–1B. Suppose a phone receives the following SMS message:

??QC?31?ES0420?F?12345678?10).

Using the flow charts of FIGS. 1A and 1B, the message will be interpreted as a feature control message. The first five characters "??QC?" define the start of control message delimiter. The receipt of these characters informs the phone to interpret the remainder of the message as a feature control message. The next data field represents the model ID number. In the example above the model ID is 31. The "?" after the number 31 is the delimiter that denotes the end of the data field. The data field following the model ID represents the minimum software version. The minimum software version applicable in this example is "ES0420". Again the data field is terminated with the "?" delimiter. The contents of the next data field, "F", inform the phone that the exact software version field is false. A false in the exact software version field allows the features of the phone to be controlled if the phone software version is equal or greater than the minimum software version. The next field, "12345678", defines the feature code. In this implementation, the feature code requires only one feature mode. The number of feature modes could either be predetermined according to the numerical value of the feature code or could be saved in memory within the phone. The feature mode, "10", provided in the next data field is the value to be assigned to the feature code. The character used to delimit the end of the feature mode, ")", also serves as the end of message delimiter. When the phone receives this character it is informed that the feature control message is complete. The feature control routine is then terminated.

A feature control message utilizing multiple feature modes and text as well as numeric fields is provided as the second example. Suppose a phone receives the following SMS message:

??QC?31?ES0420?F?98725?3?80?0?Pizza?0?6195551212)

The first four fields are interpreted identically to the example above. The start of control message delimiter is "??QC?", the model ID number is 31, the minimum software number is ES0420, and the exact software version field is set to False. The feature code in this example is 98725. For the purposes of this example this feature code is defined to be within the range of feature codes that require a data field that defines the number of feature mode fields. In the message, the value 3 in the data field following the feature code informs the phone that the next three data fields represent feature modes for the particular feature code. The first feature mode has the value 80. If the feature code 98725 represents a speed dial phone book within the phone, feature mode 80 represents location 80 within the speed dial phone book. The next feature mode is a text field. In addition to the contents of the data field and the data field delimiter there are delimiters defining the presence of text data. The "0?" denotes the start of the text data and the "?0" denotes the end. Therefore the contents of the second feature mode field, "0?Pizza?0", denote text data with the text value "Pizza". This feature mode is stored as the text value corresponding to speed dial location 80. The third and final feature mode is a number with the value "6195551212". This represents the phone number stored in the speed dial location 80. Therefore, the feature control message would program the phone number 619 555-1212 into location 80 of the phone's speed dial phone book and label the location "Pizza".

The basic phone hardware required to implement the present invention is likely already available in any phone that has SMS capability. The level of hardware changes required is slight in relation to the positive aspects of being able to remotely control phone features.

Figure 2:
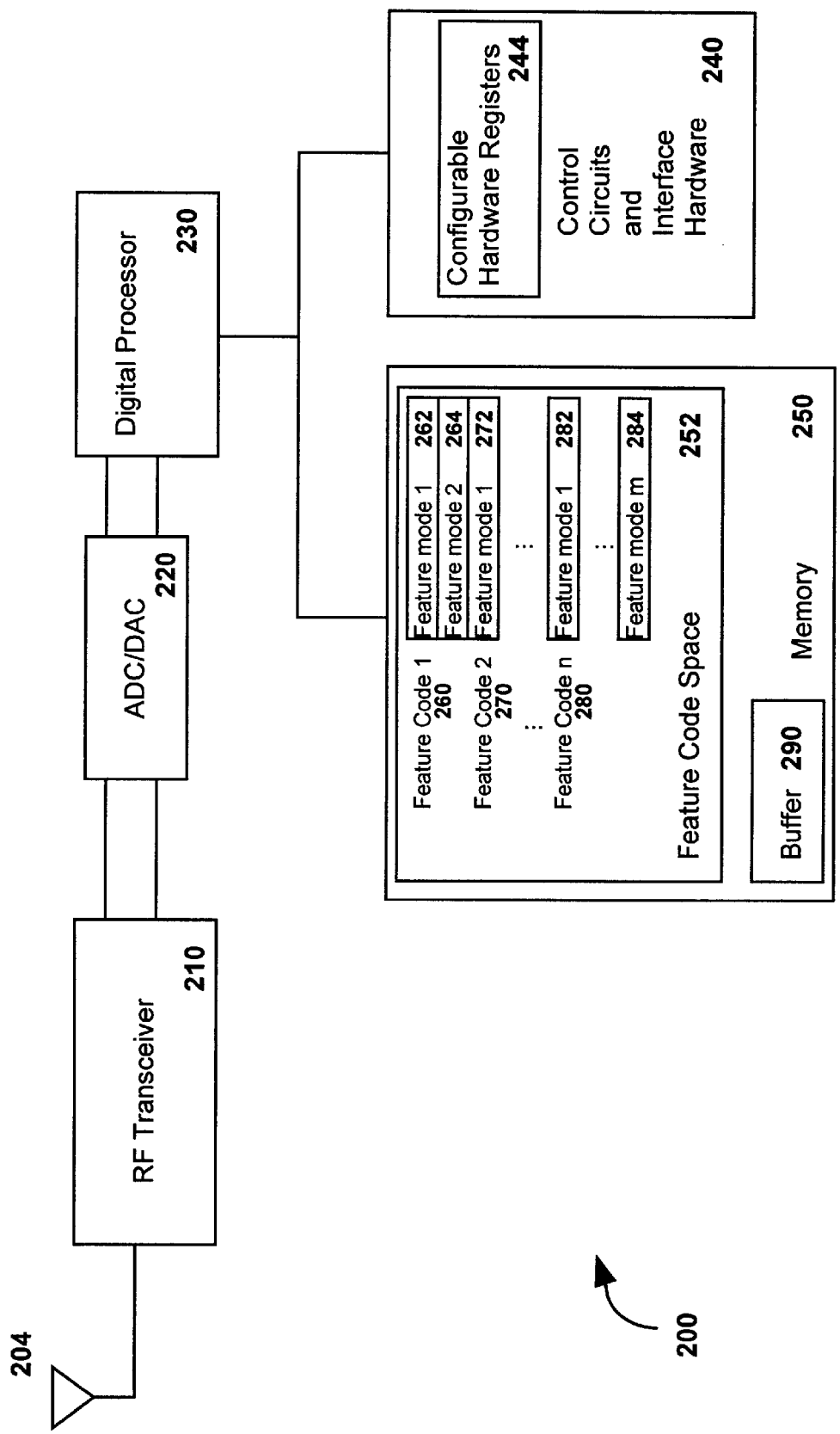
FIG. 2 is a block diagram showing implementation of the feature control hardware within a wireless phone.

Referring to FIG. 2, a wireless phone 200 interfaces to RF channels through an antenna 204. The antenna 204 serves to collect the forward link signals directed from the base station (not shown) to the phone and to broadcast the reverse link signals directed from the phone to the base station. The antenna 204 routes the forward link signals to an RF receiver (not shown) in the RF Transceiver 210. Similarly, an RF transmitter (not shown) in the RF Transceiver 210 routes the reverse link signals to the antenna 204.

Turning the focus exclusively to the receive path that an SMS message would take, within the RF Transceiver 210 the RF receiver filters and downconverts the received RF signal. The received signal is then directed to an Analog to Digital Converter (ADC) 220 where the signal is digitized in preparation of further signal processing. The digital processor 230 recovers the information contained in the received signal. In a standard wireless phone the alphanumeric portion of a received SMS message would likely be routed to interface hardware 240 such as a display (not shown).

However, in the present invention the alphanumeric portion of an SMS message is first analyzed to see if it is a feature control message. The digital processor 230 checks the SMS message to see if the first characters denote the start of a feature control message. If the beginning characters do not define a feature control message, the SMS message is serviced as a standard SMS message. Once it is determined that a feature control message is present, the digital processor parses the message and separates the individual data fields. The wireless phone memory 250 contains a predetermined feature code space 252 that holds the memory locations corresponding to the various feature codes. The feature codes retrieved from the SMS message correspond to the predefined address spaces in memory 250. The memory 250 holds a number of unique locations corresponding to the feature modes available for each feature codes. In FIG. 2, feature code 1 260 within feature code space 252 is depicted as requiring two feature modes: feature mode 1, 262, and feature mode 2, 264. As the feature modes are extracted from the SMS message they are written into memory 250 in specific locations corresponding to the active feature code. The feature mode values, e.g. 262 and 264, are used as parameters in determining the operation of the control circuits and interface hardware 240. The memory for the feature modes and the feature code space 252 are typically implemented as non-volatile memory. Implementation as non-volatile memory ensures that all information stored in the feature code space 252 remains valid even if power to the memory device is interrupted or shut off. As a precaution against incomplete messages, feature modes may be written into a buffer 290 within memory 250 and transferred to the specific feature mode locations only after all feature modes for a particular feature code are received. Alternatively, the specific feature modes corresponding to feature codes may be written directly into configurable hardware registers 244. By allowing SMS message access to reconfigurable data locations the operation and features within a wireless phone can be activated and deactivated in a remote manner.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. A method for controlling feature availability in a wireless device using SMS comprising:

sending a predetermined SMS feature control message to the wireless device;

receiving at the wireless device the predetermined SMS feature control message;

parsing the predetermined SMS feature control message to separate contents of data fields within the SMS feature control message; and controlling the feature availability according to the contents of the data fields;

wherein the predetermined SMS feature control message comprises a minimum software version which identifies the lowest version of software able to use the feature code included in the SMS feature control message; and an exact software version data field.

2. The method of claim 1 wherein the controlling step is performed only if the exact software data field is set to true and the minimum software version is exactly the same as a corresponding software version of the wireless device.

3. The method of claim 1 wherein the controlling step is performed only if the exact software data field is set to false and the minimum software version is the same or lower than a corresponding software version of the wireless device.

4. An apparatus within an SMS capable wireless device for controlling feature availability using SMS feature control messages comprising:

a digital processor;

a memory device containing at least one predetermined feature code space having at least one feature mode location; and a minimum of one hardware feature which utilizes the contents of at least one predetermined feature code space to determine the availability of each hardware feature;

wherein the digital processor determines the presence of the SMS feature control message, parses the SMS feature control message to recover a plurality of data fields, and writes the contents of the data fields to corresponding feature mode locations; and wherein the plurality of data fields comprise;

a model ID field identifying the model of wireless device the SMS feature control message is directed towards;

a feature control field identifying the specific feature code space in memory addressed;

a minimum of one feature mode fields identifying the value to be written in the corresponding feature mode locations;

a minimum software version field identifying the lowest version of software able to use the feature mode values; and an exact version field.

5. The apparatus of claim 4 where the digital processor writes the contents of the data fields to corresponding feature mode locations in memory only if the exact software data field is set to true and the minimum software version is exactly the same as a corresponding software version of the wireless device.

6. The apparatus of claim 4 wherein the digital processor writes the contents of the data fields to corresponding feature mode locations in memory only if the exact software data field is set to false and the minimum software version is the same or lower than a corresponding software version of the wireless device.

7. The apparatus of claim 4 wherein the memory device is a non-volatile memory device.

8. Apparatus for controlling feature availability in a wireless device using SMS comprising:

(a) means for receiving, at the wireless device, a previously sent, predetermined SMS feature control message;

(b) means for parsing the predetermined SMS feature control message to separate contents of data fields within the SMS feature control message; and (c) means for controlling the feature availability according to the contents of the data fields;

wherein the predetermined SMS feature control message comprises;

(d) a minimum software version which identifies the lowest version of software able to use the feature code included in the SMS feature control message; and (e) an exact software version data field.

9. The apparatus of claim 8 wherein the controlling means is structured to function only if the exact software data field is set to true and the minimum software version is exactly the same as a corresponding software version of the wireless device.

10. The apparatus of claim 8 wherein the controlling means is structured to function only if the exact software data field is set to false and the minimum software version is the same or lower than a corresponding software version of the wireless device.

* * * * *